C. E. WALKER.
REEL.
APPLICATION FILED JUNE 21, 1917. RENEWED MAR. 17, 1920.

1,352,041.

Patented Sept. 7, 1920.

WITNESSES

INVENTOR
Charles E. Walker,

BY
ATTORNEY

UNITED STATES PATENT OFFICE.

CHARLES E. WALKER, OF GRAND RAPIDS, MICHIGAN.

REEL.

1,352,041.   Specification of Letters Patent.   Patented Sept. 7, 1920.

Application filed June 21, 1917, Serial No. 176,238. Renewed March 17, 1920. Serial No. 366,690.

*To all whom it may concern:*

Be it known that I, CHARLES E. WALKER, a citizen of the United States, residing at Grand Rapids, in the county of Kent and State of Michigan, have invented certain new and useful Improvements in Reels, of which the following is a specification.

My invention relates to improvements in reels which are adapted primarily for winding heavy cables and the like on spools, and it consists in the constructions, combinations and arrangements herein described and claimed.

An object of my invention is to provide a reel which includes a carriage on which a spool is rotatably and removably mounted, the spool being rotated from the axle of the carriage as the carriage moves over the ground.

Another object of the invention is to provide a reel including a rotatable spool and a vibrating guide for spreading the wire evenly on the spool.

Another object of the invention is to provide gear connections with the axle of the carriage, and crank and pitman connections for vibrating the guide as the reel moves over the ground.

Other objects and advantages will appear from the following specification, reference being had to the accompanying drawings, in which:—

Figure 2:
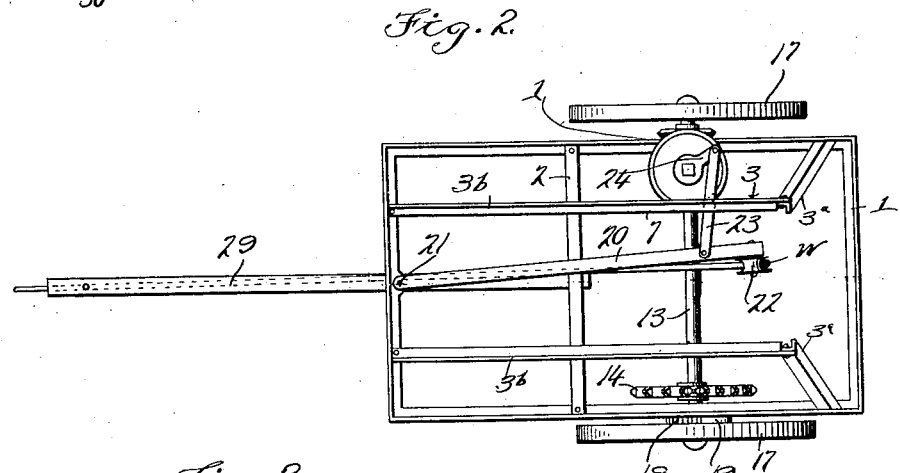
Fig. 2 is a plan view of the reel carriage, the spool shaft and its coöperating parts being omitted.

In carrying out my invention, I provide a carriage frame 1 which is substantially rectangular in shape as shown in Fig. 2. The carriage frame 1 is constructed preferably of angle iron so that it may have the required rigidity. The frame 1 is suitably braced as at 2, and a spool support which consists of the superstructure 3 is affixed to the frame 1 by rivets or in any other suitable manner.

The spool support 3 consists of the converging end members 3$^a$ to the upper ends of which, the inclined bars 3$^b$ are secured. The bars 3$^b$ have openings 4 in which a spool shaft 5 is journaled.

A cable is adapted to be wound on a spool 6 which is carried by the spool shaft 5. A dog 7 is fixed on the spool shaft 5 in such a manner that it will turn with the shaft, and the inwardly bent end of the dog 7 shown very clearly in Fig. 3 engages the arm of one of the heads of the spool 6 so that the spool may be made to turn with the shaft 5 as the shaft 5 rotates.

Figure 3:
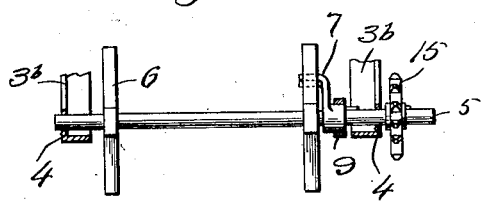
Fig. 3 is a detail sectional view of the spool shaft and spool.

A brake band 8 is applied to a brake drum 9 which is suitably fixed on the shaft 5. If it be desired, the brake drum 9 may be secured on the hub of the dog 7 as shown in Fig. 3, this particular construction however being merely representative and in actual practice, the drum 9 may be arranged in any other convenient manner.

The spool 6 is adapted to be removed from the spool shaft 5 when it is filled with wire cable. The removal of the shaft 5 is thus necessary and obviously when the drum 9 is affixed to the dog 7, it will be easier to reassemble the parts when another and empty spool is put on the shaft.

The spool 6 is removed from the spool shaft 5 by first shifting the shaft to one side. This action will cause one end of the shaft to disengage the structure 3 to such an extent as to allow the spool to be removed over the end of the shaft. Then an empty spool may be placed on the shaft and the shaft 5 is returned to its normal engagement with the super-structure, as shown in Fig. 3.

A lever 10 is fulcrumed on the side of one of the bars 3$^b$. One end of the brake band 8 is secured to the lever as shown in the drawings, and the other end of the brake band 8 is secured to an adjacent part of the same bar 3$^b$. A spring 11 is connected between the lever 10 and a hook 12. The normal tendency of the spring 11 is to pull on the lever 10 and consequently on the brake band 8. The purpose of the brake band 8 is to prevent lost motion of the spool shaft 5. The wire cable is thus tightly wound on the spool 6.

The axle 13 of the reel carries a drive sprocket 14 which drives a sprocket pinion 15 on the spool shaft 5 through the medium of a chain 16. Carriage wheels 17 are fastened on the ends of the axle 13 and rotate the axle as the reel is drawn over the ground.

A ratchet disk 18 is secured to the sprocket 14, and a spring pressed pawl 19 which engages the teeth of the ratchet 18 is secured to one of the spokes of the wheel 17 so that as the wheel rotates in a forward direction, the ratchet 18 of the drive sprocket wheel 14 will also be rotated and drive the spool shaft 5. Should the reel be backed, the dog 19 will simply ride over the teeth of the ratchet 18 and not unwind the wire on the spool 6.

The wire "W" is spread evenly over the spool 6 from side to side by a vibrating arm 20 which is fulcrumed at 21 on the front rail of the reel frame 1. A pulley 22 is journaled on the other end of the vibrating arm 20 and the wire "W" rolls over the pulley 22 as will be readily understood from the drawings.

The arm 20 is vibrated by a pitman 23 which is connected at its ends with the arm 20 and a crank 24 respectively.

A driven pinion 27 carries the crank 24 and the pinion 27 is driven by a gear 28 which is fixed on the axle 13. The rotation of the axle 13 will accordingly drive the bevel pinion 27 so that the pitman 23 is reciprocated and the arm 20 is vibrated. The ratio of the gears 27 and 28 is so proportioned that the vibrating arm 20 will move rather slowly from side to side of the frame 1. The vibrating movement of the arm 20 will be rapid enough to wind the wire evenly on the spool 6 as the spool is revolved by the driving mechanism shown.

A tongue 29 is attached to the reel frame 1. An idler pulley 30 is mounted beneath the front end of the tongue 29. The purpose of the pulley 30 is to serve as a guide for the wire "W". The pulley 30 will prevent the wire "W" from dragging on the ground to some extent and will also keep the wire "W" in proper alinement with the vibrating pulley 22.

The operation of the device is as follows. A spool 6 is first placed on the spool shaft 5 by first shifting the spool shaft 5 to one side and out of one of its bearings in the superstructure 3 and then the shaft is returned to its normal position with both end portions in engagement with the superstructure. The dog 7 is then caught in one of the arms of one of the heads of the spool 6 so that the spool may be made to rotate with the spool shaft.

The end of the wire cable or wire strand "W" passes the idler pulley 30 and is carried forwardly over the vibrating pulley 32 and secured in any suitable manner on the spool 6. The spring held brake band 8 will prevent any lost motion of the spool shaft 5 so that the wire will always remain taut on the spool.

As the reel now moves over the ground, the rotation of the wheels 17 will revolve the spool shaft 5 and thus cause the cable "W" to be wound on the spool. The rotation of the axle 13 rotates the driven gear 27 and reciprocates the pitman 23. The vibrator arm 20 is accordingly moved to and fro across the reel frame 1 and spreads the wire "W" in even layers over the spool 6.

When the spool 6 is filled, it may be removed from the spool shaft 5 by again slipping the shaft from one of its bearings and removing the spool.

Figure 1:
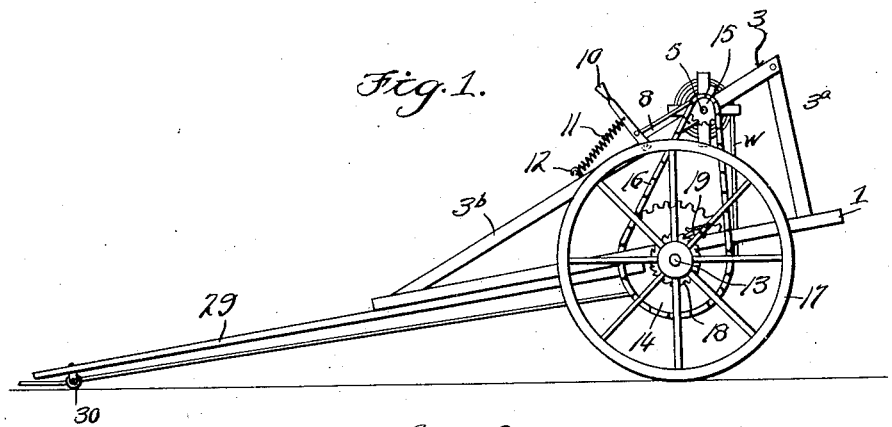
Figure 1 is a side elevation of the reel.

As will be seen by referring to Figs. 1 and 2, the carriage frame is formed of side and end members constructed of angle bars which are L-shaped in cross section. The superstructure includes converging end members and inclined bars, the bars being connected to the upper ends of these end members. The lower ends of the end members and inclined bars are carried by the carriage frame and engage the L-shaped bars at the angles, thus causing strain upon the superstructure to bring the lower ends into a firmer engagement with the carriage frame and prevent the displacement thereof as shown in Fig. 2. It will further be noted that the spool is carried upon the inclined bars and strain imparted by the spool to the superstructure will tend to swing the upper ends of the converging end members nearer to each other and force the lower ends of the inclined bars and end members into a firmer engagement with the carriage frame, instead of expanding the superstructure and possibly breaking or injuring the same when in use.

While the construction and arrangement of the device as illustrated in the drawings is that of a generally preferred form, obviously modifications and changes may be made without departing from the spirit of the invention or the scope of the claim.

I claim:—

In a device of the class described, the combination of a carriage frame formed of angle bars which are L-shaped in cross section, converging end members fixed to said angle bars and extending upwardly therefrom adjacent one end of said frame, inclined angle bars connected to the remaining end of said frame and having their upper ends connected to the upper ends of the converging end members, thus forming a superstructure, a reel carried upon said inclined bars, means for rotating said reel, whereby the strain imparted to the support by said reel will tend to slightly collapse the superstructure for holding the same against expanding strain, the lower ends of said converging end members and said inclined bars engaging the carriage frame at the angles of the bars whereby the superstructure will be held against displacement.

In testimony whereof I affix my signature in presence of two witnesses.

CHARLES E. WALKER.

Witnesses:
Jas. N. Vogt,
Jane Mick.